Sept. 11, 1928.　　　　　　　　　　　　　　　　　1,683,793
J. O. NYMAN
BUMPERS FOR SLIDING DOORS
Filed July 2, 1927

Inventor
John Oscar Nyman
By
Freare and Bond  Attorney

Patented Sept. 11, 1928.

1,683,793

UNITED STATES PATENT OFFICE.

JOHN OSCAR NYMAN, OF CANTON, OHIO, ASSIGNOR TO THE UNITED METAL PRODUCTS COMPANY, OF CANTON, OHIO, A CORPORATION OF OHIO.

BUMPER FOR SLIDING DOORS.

Application filed July 2, 1927. Serial No. 203,117.

The invention relates to bumpers, and more particularly to a bumper especially adapted for use upon sliding or bi-parting doors such as are provided at elevator entrances and the like.

The object of the improvement is to provide a simple and efficient bumper for the adjoining edges of bi-parting doors in which a dove-tailed channel strip is spot welded or otherwise attached to the edge of each door, and arranged to contain a transversely tapered rubber bumper adapted to contact with the bumper upon the adjoining edge of the other door, when the doors are in closed position, one bumper having a rounded nose adapted to be received in a rounded groove in the other bumper.

Figure 2:
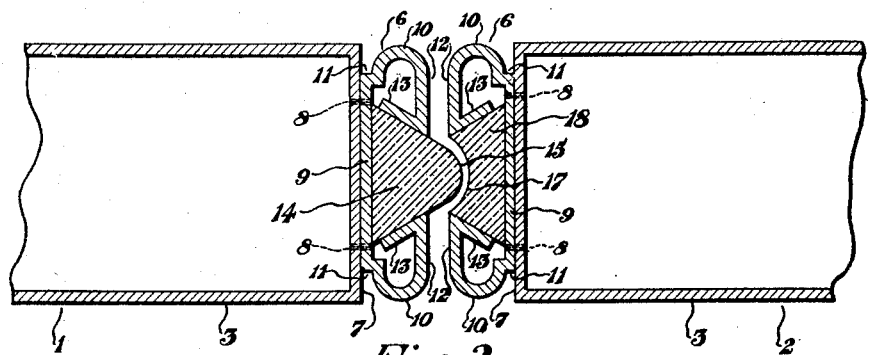
Figure 1:
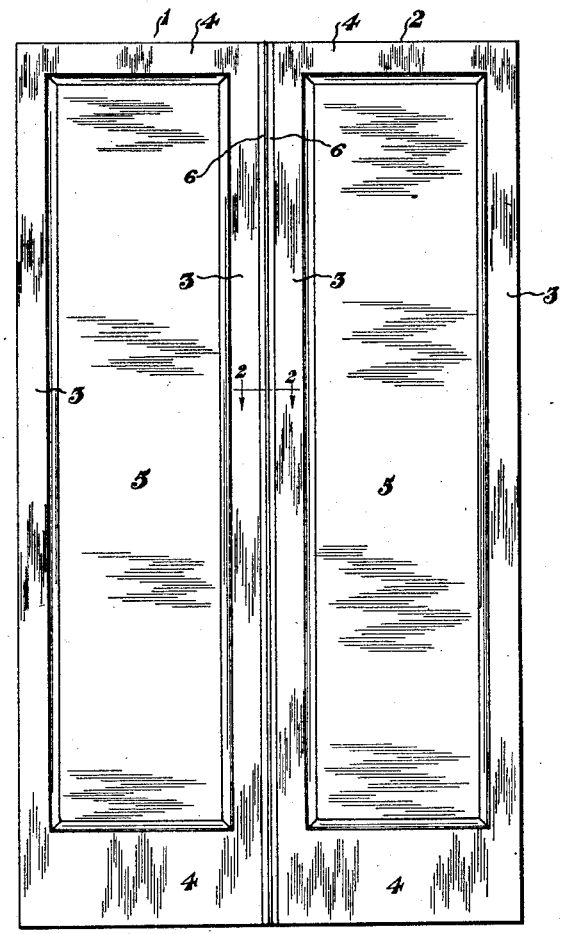

An embodiment of the invention is illustrated in the accompanying drawing, in which Figure 1 is a side elevation of a pair of bi-parting metal doors provided with the improved bumpers, and Fig. 2, an enlarged transverse section through the meeting edge portions of the doors, taken substantially on the line 2—2, Fig. 1.

Similar numerals refer to similar parts throughout the drawing.

A pair of bi-parting sliding doors is indicated generally at 1 and 2. These doors may be of any usual and well known construction of metal door comprising the hollow stiles 3, rails 4, and panels 5.

A channel strip, indicated generally at 6, is attached to the meeting edge 7 of the inner or adjoining stile 3 of each door, as by spot welding such as indicated at 8.

As shown in Fig. 1, each of these channel strips extends the entire length of the door. Each strip has the flat back portion 9 of a width less than the edge of the stile to which it is attached, and may be provided with the curved side edge portions 10 off-set from the back as at 11.

Each edge portion of the channel strip is continued from the curved side edges 10 toward the other edge portion of the strip in a plane parallel with the back 9 forming a straight front portion, as shown at 12 and terminates in an inturned inclined flange 13, forming a dove-tail channel to receive the rubber bumper strip.

The door 1 may be provided with a rubber bumper strip 14 substantially triangular in cross section and having the rounded nose 15 adapted to be received into the rounded groove 17 formed in the free edge portion of the rubber bumper strip 18 which is carried in the channel strip of the door 2.

Each of these rubber bumpers may extend the entire length of the door and as the same are tapered transversely to correspond with the dove-tail channels formed by the angular flanges 13 of the channel strips, it will be seen that these bumpers are securely held in position within the channel strips, being substantially wedged in place therein.

These rubber bumpers permit the doors to be closed quietly without any undue shock and since the one bumper is provided with a rounded groove to receive the nose portion of the other bumper, it will be seen that when the doors are in closed position the bumpers will interfit, forming the closed joint at the meeting edges of the doors.

I claim:

1. In combination with a pair of bi-parting doors, a channel strip on the meeting edge of each door, and a rubber bumper located in each channel strip, each channel strip having a back portion attached to the door, curved side edge portions and straight front portions, terminating in inturned angular flanges.

2. In combination with a pair of bi-parting doors, a channel strip on the meeting edge of each door, and a rubber bumper located in each channel strip, each channel strip having a back portion attached to the door, side edge portions and inturned front portions terminating in backwardly disposed angular flanges.

3. A bumper including a channel strip, the channel strip having a back portion, side edge portions and inturned front portions terminating in backwardly disposed angular flanges, and a rubber bumper mounted between said angular flanges in said channel strip.

4. A bumper including a channel strip, the channel strip having a back portion, curved side edge portions and straight front portions terminating in inturned angular flanges, and a rubber bumper mounted between said angular flanges in said channel strip.

In testimony that I claim the above, I have hereunto subscribed my name.

JOHN OSCAR NYMAN.